G. W. GOODRIDGE.

ELECTRIC LAMP SOCKET.

APPLICATION FILED NOV. 23, 1915.

Reissued Apr. 11, 1916. 14,103.

Witness

Titus H. Irons.

Inventor

Gilbert W. Goodridge,

By his Attorneys

Arson and Arson

UNITED STATES PATENT OFFICE.

GILBERT W. GOODRIDGE, OF BRIDGEPORT, CONNECTICUT, ASSIGNOR TO THE BRYANT ELECTRIC COMPANY, A CORPORATION OF CONNECTICUT.

ELECTRIC-LAMP SOCKET.

14,103. Specification of Reissued Letters Patent. Reissued Apr. 11, 1916.

Original No. 1,121,348, dated December 15, 1914, Serial No. 806,298. Application for reissue filed November 23, 1915. Serial No. 63,143.

*To all whom it may concern:*

Be it known that I, GILBERT W. GOODRIDGE, a citizen of the United States of America, and residing at Bridgeport, in the county of Fairfield and State of Connecticut, have invented a certain new and Improved Electric-Lamp Socket, of which the following is a specification.

My invention relates to electric lamp sockets and particularly to the casing thereof, the object of my invention being to improve the engagement between the usual shell and cap elements thereof.

Figure 1:
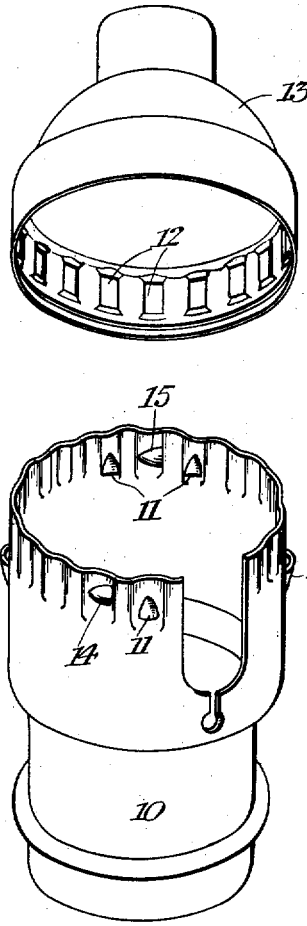
Figure 3:
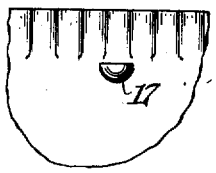
Figure 2:
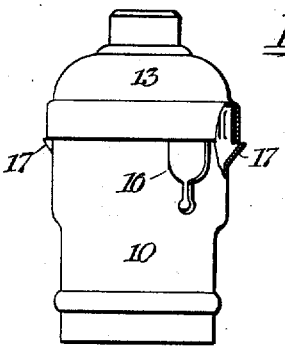

In the accompanying drawing, Figure 1 is a perspective of a casing shell and cap, detached; Fig. 2 is an elevation thereof assembled, and partially in section; and Fig. 3 is an elevation of a detail.

The cap and shell fastening to which the present invention relates, is of the character shown in my prior Patents 872,283; 879,819 (reissued 13,227) and 958,626. As these patents show I have heretofore proposed to provide the upper portion of the shell 10 with outwardly pressed latching projections 11 on substantially opposite sides thereof which take into any of a series of recesses 12 formed in the lower peripheral flange of the cap 13, to prevent endwise separation of the parts after they have been sleeved together into latched position. To prevent relative rotary movement of the cap and shell in latched position, I have not only corrugated the sleeved portions of the shell and cap but also provided other projections 14, 15 the engaging edges of which are vertical and face in opposite directions. These bumps engage the opposite vertical edges of the recesses 12 in the flange of the cap and obviously prevent the latter from rotating in either direction on the shell. In order that these latching elements may be readily freed to permit the removal of the cap, certain of the projections on the shell are located adjacent the slit 16 in the upper edge of the shell. Since the latter is made of relatively thin spring metal, slight manual pressure on the portion of the shell carrying the projections 11 and 14 adjacent the slit 16, is sufficient to press them inward and out of engagement with the coöperating elements on the cap flange whereupon the cap may be rocked open, the catches on the opposite side of the cap serving temporarily as a sort of hinge, until they are freed by the further opening movement of the cap.

As will be readily understood it is practically impossible to locate these latter catches at any point other than substantially opposite the catches adjacent the slit 16, since otherwise the engagement between the cap and shell would be insecure. Nor can these catches be repeated around the upper edge of the shell since it would then be impossible to readily free the cap from the shell after they had once been latched.

The arrangement of the two groups of latching elements at points substantially opposite on the shell, results in an engagement which while perfectly strong, gives rise to an impression of insecurity by reason of the fact that the practically unavoidable play between the sleeving sections of the shell and cap permits the cap to rock slightly on the axis formed by the projections 11. This may be prevented in various ways. The simple means here shown comprises a pair of outwardly extending projections 17 on opposite sides of the shell and on an axis at right angles to that formed by the projections 11. The upper or engaging edges of these projections 17 lie substantially in the plane of the lower edge of the flange of the cap in the latched position of the latter and thus form seats on opposite sides of the shell which prevent it from rocking in either direction. The cap is thus supported at four points substantially equally spaced around the shell, while it may be readily tilted open as before, by merely pressing in the latching element 11 carried by the shell adjacent the slit 16.

I claim as my invention:

1. A socket casing comprising cap and shell sleeved together, said shell having a slit extending into said sleeved portion, coöperating latching elements on said cap and shell arranged within the sleeving area, said latching elements on the shell lying on substantially opposite sides thereof and adjacent the slit on one side, in combination with projections on the shell underlying the lower edge of the cap at opposite points and substantially at right angles to the axis of the latching elements, substantially as described.

2. A casing for electrical fittings comprising coöperating parts sleeved together, cooperating latching means on said parts detachably securing said casing parts together against endwise separation and relative rotation, the latching means to prevent endwise separation of the parts lying at substantially diametrically opposite points on the casing and forming a rocking axis, together with projections on one of said parts independent of the latching means and engaging the other part on opposite sides of said axis to prevent rocking of the parts with relation to each other on said axis.

3. A casing for electrical fittings comprising cap and shell sleeved together, coöperating latching means on said parts detachably securing the same together against endwise separation and relative rotation, the latching means on the shell lying at substantially opposite points thereon and forming a rocking axis, together with projections on said shell on opposite sides of the axis of said latching elements and underlying the lower edge of the cap to prevent rocking of the parts with relation to each other on said axis.

In testimony whereof I have signed my name to this specification, in the presence of two subscribing witnesses.

GILBERT W. GOODRIDGE.

Witnesses:

H. M. WICHERT,

A. H. JONES.